United States Patent Office 2,931,476
Patented Apr. 5, 1960

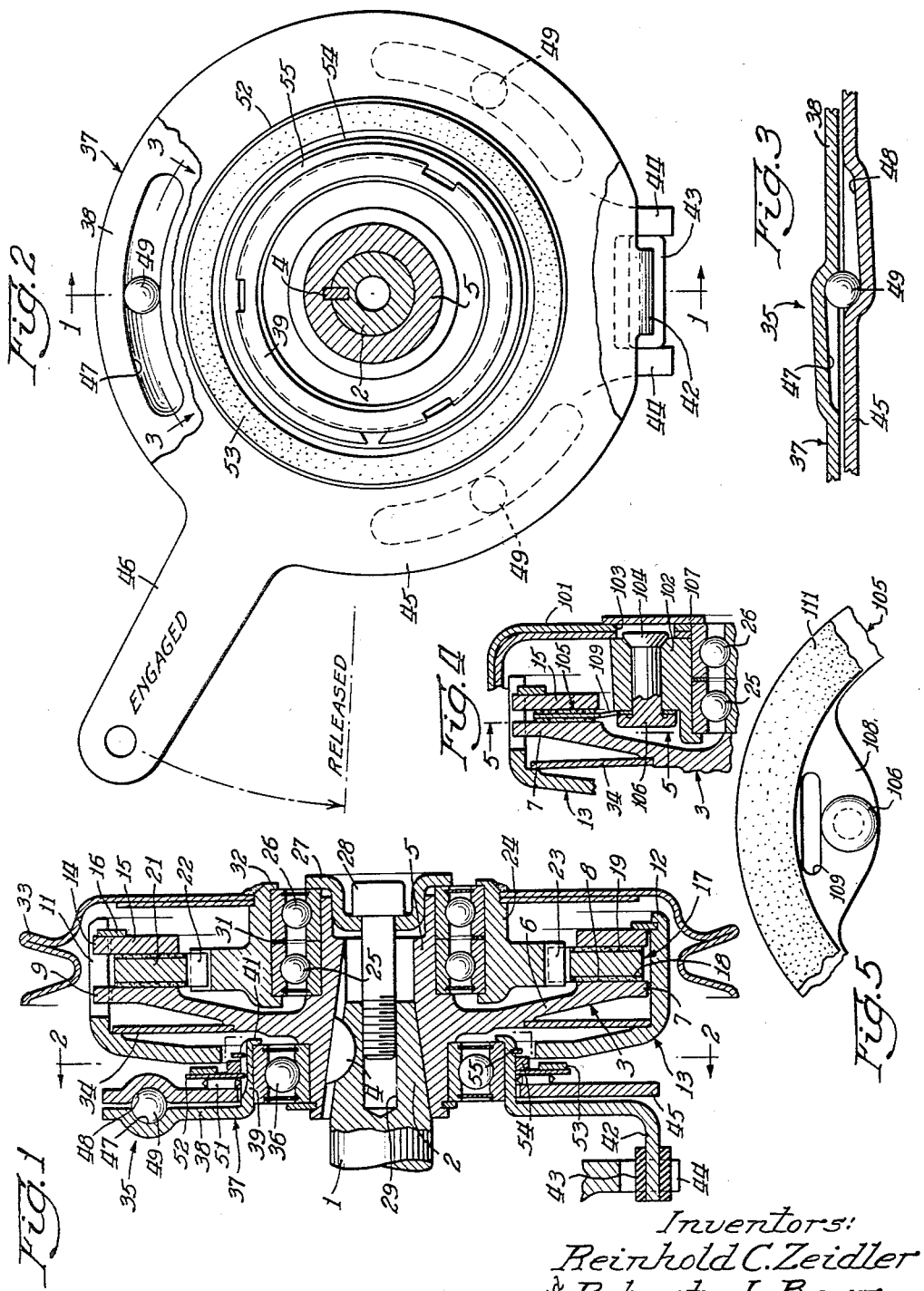

2,931,476

DISCONNECT CLUTCH ASSEMBLY

Reinhold C. Zeidler and Robert J. Berr, Detroit, Mich., assignors to Borg-Warner Corporation, Chicago, Ill., a corporation of Illinois Application March 13, 1957, Serial No. 645,738

3 Claims. (Cl. 192—89)

This invention relates to clutch devices, and more particularly to clutch devices particularly adapted for effecting driving connection from a suitable source of power to vehicle air conditioning compressor or other accessory.

In the copending application of Zeidler et al., Serial No. 608,782, filed September 10, 1956, and entitled "Clutch Devices," there is disclosed and claimed a unique disconnect clutch assembly which is small in size and low in cost, but which also requires only a minimum of maintenance and inherently possesses long life. The present invention is a further improvement which, while retaining all of the advantages of the aforementioned prior structure, additionally inherently incorporates further advantages.

For example, one object of the present invention is to provide a new and improved compressor disconnect clutch assembly suitable for use on any standard compressor regardless of variations in the spacing between the compressor housing and the compressor drive shaft.

Another object is the provision of a device in accordance with the preceding object in which the entire structure may be tested for torque capacity and release before shipment, the clutch being shipped in "package" form and merely connected to the compressor driving part by a single screw.

Another object is the provision of a device in accordance with the preceding objects in which standard parts may be employed which will fit substantially all of the commercial compressors.

Another object is the provision of a device in accordance with the preceding objects in which the entire clutch device is mounted and supported solely from the compressor shaft, and in which the spring bias of the clutch is contained only within the clutch housing, so that no reaction thrust is transferred to the compressor shaft bearings.

Other objects and features of the invention will be readily apparent to those skilled in the art from the specification and appended drawings illustrating certain preferred embodiments in which:

Figure 1 is a vertical sectional view through the center of a device constructed in accordance with the principles of the present invention, substantially along the plane of line 1—1 of Figure 2;

Figure 2 is a sectional view along the plane of line 2—2 of Figure 1 with portions "broken away" to facilitate the explanation;

Figure 3 is a sectional view along the plane of line 3—3 of Figure 2;

Figure 4 is a partial sectional view of a modified device incorporating the principles of the present invention;

Figure 5 is a partial sectional view along the plane of line 5—5 of Figure 4.

In Figure 1 there is illustrated a drive shaft 1 of an accessory, for example the compressor of an air conditioner, having a tapered outermost portion 2 adapted to complementarily support a generally annular plate 3 having a woodruff key 4 disposed in a suitable slot in the shaft 1 so that the shaft and plate 3 rotate together. The plate 3 comprises a generally annular horizontal portion 5 and extending radially outwardly therefrom is a generally saucer shaped flange 6 terminating in a clutch plate portion 7 which is annular in configuration and which is provided with a radially extending, forwardly facing face 8. The annular clutch plate 7 is provided with a plurality of circumferentially spaced, outwardly projecting tabs 9 respectively received in a plurality of circumferentially spaced slots 11 in a cylindrical, horizontally extending flange 12 formed integrally on a generally cup shaped member 13. The slots 11 also respectively receive a plurality of generally rectangular tabs 14 projecting radially outwardly from an annular clutch plate 15 spaced longitudinally from the clutch plate 7. The flange 12 is provided with a suitable notch which receives a stop ring 16 adapted to prevent axial movement of the clutch plate 15 to the right, from the view of Figure 1, relative to the member 13.

Disposed between the clutch plates 7 and 15 is a driving clutch plate 17. Clutch plate 17 comprises a pair of friction facing 18 and 19, annular in configuration, glued or otherwise fixedly mounted to a generally annular core 21 of steel or other suitable material. The core 21 has a generally annular opening centrally located therein which has formed thereon a plurality of gear teeth 22 throughout the periphery of the opening which are adapted to mesh with a plurality of gear teeth 23 externally provided on a generally annular hub 24. The hub 24 is rotatably supported from the horizontally extending portion 5 of the plate 3 by a pair of single roll ball bearings 25 and 26. The inner race of the ball bearing 25 engages a shoulder formed on the plate 3, while the outer race thereof engages a suitable flange on the hub 24, as illustrated in Figure 1. The inner race of the ball bearing 26 is engaged by an annular clip 27, generally U-shaped in cross section, having a central opening therein through which a bolt 28 extends, the bolt being received in a suitable threaded opening 29 in the compressor shaft 1. The outer race of the ball bearing 26, and the outer race of ball bearing 25 are separated by a spacer washer 31 approximately 0.01 inch thick, and the outward portion of the outer race of the bearing 26 is secured by a staking operation, as indicated at 32, to the hub 24. The ball bearings 25 and 26 are thereby preloaded, as will be apparent to those skilled in the art. The hub 24 also supports a pulley 33, rigidly connected to the hub 24 by suitable means, such as welding, the pulley 33 being adapted to be driven from the fan belt of the vehicle in conventional manner.

The clutch, comprising the clutch plates 7, 17 and 15, is biased toward the engaged position thereof indicated in Figure 1 by a belleville washer 34 disposed between the flange 6 and the member 13, the washer 34 being generally annular in configuration and having a central annular opening therein received upon a suitable shoulder in the flange 6 as illustrated in the drawings. It will be seen that washer 34 biases member 13 toward the left in Figure 1 so that stop ring 16 forces clutch plate 15 into engagement with clutch plate 17; this in turn forces clutch plate 17 into engagement with clutch plate 7. To effect disengagement of the clutch there is provided a camming assembly, indicated in general by the numeral 35.

The camming assembly 35 is generally circular in configuration, and is rotatably supported from the horizontally extending portion 5 by a ball bearing 36 fixed against axial movement with respect to the portion 5 of the plate 3 by a spaced annular shoulder and stop ring as illustrated in Figure 1. The camming assembly comprises a reaction member or plate 37 which comprises a generally annular, radially extending portion 38, a forwardly (to the right in Figure 1) extending portion 39 mounted on the outer race of the bearing 36 which terminates in a forwardly facing surface having a plurality of radially extending tabs 41 engaging the forwardly facing surface of the outer race of bearing 36, and a rearwardly extending arm 42. The arm 42 carries a rubber grommet 43 and is adapted for insertion between a pair of spaced arms 44 integral with the body of the compressor, or other fixed part, so that arm 42 is permitted some longitudinal movement but is prevented against rotative movement. Obviously the length of arm 42 may be varied as desired to accommodate any spacing between the clutch device and the compressor body.

Camming assembly 35 also comprises a rotatable plate 45 having an integral arm 46 projecting radially outwardly thereof, arm 46 being adapted for attachment to any suitable mechanism for effecting movement thereof between the "engaged" and "released" positions indicated in Figure 2. Portion 38 of plate 37 is provided with three circumferentially spaced grooves 47 having inclined surfaces as illustrated in Figure 3, and plate 45 is also provided with three circumferentially spaced grooves 48, a ball 49 being received in each pair of grooves 47—48. It will be readily apparent to those skilled in the art that rotation of the arm 46 will effect a camming action effected by the balls 49 in the grooves 47—48 to effect axial movement of the plate 45. In engagement with the radially inner, front surface of the plate 45 is an annular thrust bearing 51, the forward face of which is engaged by a plate 52, annular in configuration and having a central opening therein which is keyed to the portion 39 of the reaction plate 37 so as to be axially movable relative to the reaction plate 37 but nonrotatable relative thereto. Glued or otherwise fixedly mounted to the outer periphery of the forwardly facing portion of the plate 52 is a carbon graphite bearing ring 53 which is in registry with the radially inner portion of the member 13 as illustrated in Figure 1. The radially inner portion of the plate 52 is engaged by an annular, sinuous spring 54, the forwardly facing portion of which abuts against a suitable stop ring 55 fixedly mounted with respect to the portion 39 of the reaction plate 37. It will be seen that the spring 54, therefore, biases the plate 52, the bearing 51, and the plate 45 toward the reaction plate 37 at all times.

As will be apparent from the drawings, when the arm 46 occupies the "engaged" position illustrated in Figure 2, the balls 49 respectively lie in low portions of the camming grooves 47 and 48, and the spring 54 biases the plate 52 toward the reaction plate 37. As a result the graphite ring 53 on the plate 52 is spaced from the member 13, and the belleville washer 34 holds the clutch plates 7, 17 and 15 in frictional engagement. As a result when the fan belt drives the pulley 33, hub 24 will be rotated, clutch plate 17 will rotate, clutch plates 7 and 15 will be rotated in view of their frictional engagement with the clutch plate 17, and this rotative movement will be transmitted by the flange 6 to the horizontally extending portion 5 of the plate 3, and from this portion 5 through the key 4 to the compressor shaft 1. Obviously during the period, the member 13 and the belleville washer 34 will also rotate. When it is desired to disengage the clutch to stop rotation of the compressor shaft 1, arm 46 is rotated from the "engaged" position illustrated in Figure 2 to the "released" position indicated in that figure. The plate 45 is therefore rotated relative to the reaction plate 37, the latter plate being held against rotation by the arm 42. The balls 49 will therefore occupy relatively shallower portions of the spaces defined by the grooves 47 and 48 so that the plate 45 will be moved away from the reaction plate 37 against the bias of the spring 54. As this forward movement of plate 45 continues, graphite ring 53 will be brought into engagement with the associated portion of member 13 and effect forward movement of member 13 against the bias of the belleville washer 34. It will therefore be seen that this will carry clutch plate 15 to the right, in the view of Figure 1, away from the clutch plate 17. Inasmuch as clutch plate 17 has only a "gear tooth" connection to the hub 24, it also will move axially forwardly to a slight degree interrupting the driving connection with the clutch plate 7. As a result, continued rotation of the pulley 33 of the fan belt will still effect rotation of hub 24 and clutch plate 17, but this rotation will not be imparted to the clutch plates 15 and 7, nor to the compressor shaft 1 which therefore will no longer rotate. When it is desired to reengage the clutch, the arm 46 is rotated from the "released" position indicated in Figure 2 to the "engaged" position illustrated in that figure. The plate 45 will thereby be rotated back into the position illustrated in the figures so that the balls 49 once again permit the spring 54 to move the plate 52 with the graphite ring 53 thereon and the plate 45 toward the reaction plate 37, graphite ring 53 once again assuming a position spaced from the member 13. Belleville washer 34 may then return the member 13 to the position illustrated in Figure 1 in which the plate 15 has been forced into frictional engagement with the clutch plate 17, plate 17 being forced also into frictional engagement with the clutch plate 7. Rotation of the pulley 33 will then once again be transmitted to the compressor drive shaft 1.

In Figures 4 and 5 there is shown a modified device incorporating the present invention. This is substantially identical with the structure previously described herein, differing therefrom in the construction of the driving clutch plate member and in the connection thereof to the hub to which it is mounted. With this arrangement, a pulley 101, similar to the pulley 33, is welded or otherwise fixedly mounted to an annular hub 102 mounted upon the ball bearings 25 and 26. Pulley 101 has a plurality of circumferentially spaced openings 103 adapted to respectively receive one end of a plurality of rivets 104. The rivets 104 extend respectively through circumferentially spaced openings in an annular driving clutch plate 105 as more fully explained hereinafter. Rivets 104 have heads 106 which serve to fixedly clamp the clutch plate 105 to the hub 102. An annular plate 107 overlies the openings 103, plate 107 being fixedly mounted to the hub 102 by suitable means (not shown) such as bolts and having one end engaging the forward face of the outer race of ball bearing 26.

The driving clutch plate 105, generally annular in configuration, has a plurality of integral flexible tabs 108 extending inwardly thereof, as illustrated in Figure 5, these tabs having holes through which rivets 104 respectively extend and being engaged by the rivet heads 106 so that the clutch plate 105 is fixed to the hub 102. These tabs 108 are each provided with an elongated opening 109 so that the outer part of the plate 105, provided on its opposite sides with friction facings 111, may be flexed. More specifically, when the driven clutch plates 7 and 15 are moved into engagement with the clutch plate 105, the outer portion thereof is flexed, as illustrated in Figure 4. Conversely, when the arm 46 is moved to its "released" position so that the driven clutch plates 7 and 15 are moved away from each other, the clutch plate 105 will assume a straightened position in which the friction facings thereon are spaced from the driven plate 7 by an amount preferably of the order of 0.002 to 0.014 inch. It will be seen that with the construction illustrated in Figures 4 and 5, rattling noises occasioned by movement of the driving clutch plate with respect to its hub are eliminated.

It should be particularly noted that with the device of the present invention, all of the parts may be assembled and checked for release and torque capacity before leaving the factory, no adjustments being necessary in the field inasmuch as the entire structure is adapted to be supported by the compressor shaft. Regardless of the normal spacing between the compressor body and the shaft thereof, this spacing varying with different commercial compressors, the device may advantageously be employed inasmuch as arm 42 is made of sufficient length to engage the compressor body or other fixed support, and in any event sufficiently long to overcome any spacing variations found in the commercially available compressors of the type for which this clutch is useable. It should further be noted that this clutch may be utilized with these varying types of commercial compressors without changing any parts to accommodate these variations in the commercial compressors.

It will further be seen that the device is very simple and compact, and yet sturdy enough to have extremely long life. In this regard it should be noted that the graphite bearing 53 is normally spaced from the member 13 and that rotation between these parts when they are in engagement occurs for only an extremely short period of time; when the device is to be disengaged, member 13 is engaged by the bearing 53 only through a period sufficiently long to move the clutch plate 15 away from the clutch plate 17, after which the member 13 will stop rotating. Similarly member 13 will rotate slightly relative to bearing 53 when it is engaged thereby during the movement toward engaged position, but this rubbing contact exists for only a fraction of a second under normal operating conditions.

Furthermore, it is particularly important to notice, especially in regard to devices constructed as illustrated in Figures 4 and 5, that rattling noises between the various parts of the assembly are substantially eliminated. More specifically, no rattle can occur between the driving clutch plate and its hub because of the riveted—or other fixed—connection therebetween; in addition, rattling noises between the driven clutch plates and the member 13 are eliminated due to the action of the belleville washer 34 which, when the device is in its engaged condition, keeps these parts under a substantial bias which substantially eliminates relative movement therebetween.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. In a clutch assembly adapted for mounting upon an accessory driving shaft comprising a pulley, an annular hub fixedly connected thereto, driving plate means mounted on said hub, driven plate means adapted to engage frictionally said driving plate means so as to be driven therefrom, a supporting member having a tubular central portion adapted for mounting upon the accessory driving shaft, said driven plate means comprising a first plate integral with said supporting means and a second plate spaced from said first plate, said driven plate means further including drum means having a lug and slot connection to said first and second plates and biasing means between said drum means and said supporting member, means on said tubular central portion effective to connect said supporting member to the accessory driving shaft, means rotatably supporting said hub upon said supporting member, means operable to effect relative movement between said driving and driven plate means, and means rotatably supporting said operable means upon said supporting member.

2. In a clutch assembly adapted for mounting upon an accessory driving shaft comprising a pulley, an annular hub fixedly connected thereto, driving plate means mounted on said hub, driven plate means adapted to engage frictionally said driving plate means so as to be driven therefrom, means for fixedly mounting said driving plate means to said hub, drum means having a lug and slot connection to said driven plate means, a supporting member having a tubular central portion adapted for mounting upon the accessory driving shaft, means on said tubular central portion effective to connect said supporting member to the accessory driving shaft, means rotatably supporting said hub upon said supporting member, means operable to effect relative movement between said driving and driven plate means, means rotatably supporting said operable means upon said supporting member, and biasing means between said drum means and said supporting member.

3. In a clutch assembly adapted for mounting upon an accessory driving shaft comprising a pulley, an annular hub fixedly connected thereto, driving plate means mounted on said hub, driven plate means adapted to engage frictionally said driving plate means so as to be driven therefrom, a supporting member having a tubular central portion adapted for mounting upon the accessory driving shaft, said driven plate means comprising a first plate integral with said supporting member and a second plate spaced from said first plate, drum means having a lug and slot connection to said first and second plates, biasing means between said drum means and said supporting member urging said drum means and said supporting member toward a first relative position, means on said tubular central portion effective to connect said supporting member to the accessory driving shaft, means rotatably supporting said hub upon said supporting member, means operable to effect relative movement between said driving and driven plate means, means rotatably supporting said operable means upon said supporting member, and means fixedly mounting said driving plate means to said hub.

References Cited in the file of this patent

UNITED STATES PATENTS

| 1,010,366 | Herndon | Nov. 28, 1911 |
| 1,790,284 | Reed | Jan. 27, 1931 |
| 2,679,769 | Parrett | June 1, 1954 |
| 2,771,977 | Uher | Nov. 27, 1956 |